United States Patent [19]
Foster et al.

[11] Patent Number: 5,526,984
[45] Date of Patent: Jun. 18, 1996

[54] HYDROGEN TORCH HAVING CONCENTRIC TUBES AND REVERSE BALL JOINT CONNECTION

[75] Inventors: Bryan D. Foster, Holden; William J. Elliot, Watertown; John T. Vayda, West Brookfield, all of Mass.

[73] Assignee: Saint-Gobain/Norton Industrial Ceramics Corp., Worcester, Mass.

[21] Appl. No.: 276,228

[22] Filed: Jul. 18, 1994

[51] Int. Cl.⁶ ........................................ B05B 7/08
[52] U.S. Cl. ............................................... 239/423
[58] Field of Search .................. 239/398, 416.5, 239/416.4, 423, 424

[56] References Cited

U.S. PATENT DOCUMENTS

| | | | |
|---|---|---|---|
| 3,831,857 | 8/1974 | Scott | 239/424 |
| 4,022,283 | 5/1977 | Zeley | 239/424 |
| 4,184,637 | 1/1980 | Mushenko et al. | 239/424 |
| 4,417,692 | 11/1983 | Andrejco et al. | 239/424 |
| 4,575,609 | 3/1986 | Fassel et al. | 219/121 PY |
| 4,788,401 | 11/1988 | Kleppen | 219/75 |
| 5,000,771 | 3/1991 | Fleming, Jr. et al. | 65/2 |
| 5,051,557 | 9/1991 | Satzger | 219/121.52 |
| 5,147,998 | 9/1992 | Tsantrizos et al. | 219/121.5 |
| 5,200,595 | 4/1993 | Boulos et al. | 219/121.52 |
| 5,257,926 | 11/1993 | Drimer et al. | 431/154 |
| 5,337,961 | 8/1994 | Brambani et al. | 239/424 |

FOREIGN PATENT DOCUMENTS 287710  3/1991  Germany.

OTHER PUBLICATIONS

J. C. Eames, C. J. O'Keefe and L. E. Dotter, "Practical Design for an ICP Demountable Plasma Torch", Applied Spectroscopy, vol. 46, No. 11, 1992, pp. 1745–1746.

*Primary Examiner*—Karen B. Merritt
*Attorney, Agent, or Firm*—Thomas M. DiMauro

[57] ABSTRACT

A hydrogen torch comprising concentric inner and outer fluid delivery tubes wherein the outer tube comprises silica and the inner tube comprises silicon carbide. One end of the inner tube is connected to a third tube comprised of silica which has an inlet in fluid connection with a hydrogen supply line. The outer tube is in fluid connection with an oxygen supply line. A reverse ball joint connection is used to join the tubes and defines an annulus between the inner and outer tubes through which the oxygen can flow and be isolated from the hydrogen flowing within the inner tube.

14 Claims, 2 Drawing Sheets

HYDROGEN TORCH HAVING CONCENTRIC TUBES AND REVERSE BALL JOINT CONNECTION

BACKGROUND OF THE INVENTION

In the manufacture of semiconductor devices, the surface of the silicon wafer must often be oxidized to form a silica layer on the surface. One conventional manner of achieving this is to place the wafer in a heated, uncontaminated container called a process tube and inject a highly pure water vapor into the process tube. The pure water vapor contacts and reacts with the surface of the wafer to produce the desired silica layer.

The pure water vapor is typically created by a hydrogen torch system housed either within or outside of the process tube. FIGS. 1 and 2 present prior art monolithic torches having a hydrogen inlet A and outlet B, and an oxygen inlet C and outlet D. This system delivers oxygen and hydrogen in separate streams into the process tube (or external combustion chamber), wherein these gases are mixed at temperatures above about 600° C. The high temperature mixing produces a controlled combustion which reaches temperatures of at least about 1200° C. to form water vapor.

Some conventional hydrogen torches are complicated monolithic silica tubes. However, the temperature at the exit of the hydrogen delivery tube often reaches at least about 1200° C. The severity of this temperature combined with the steam atmosphere in the combustion chamber causes the typical silica delivery tube to disintegrate, initially releasing silica particles which can contaminate the semiconductor manufacturing process and eventually causing the tube to lose both dimensional and structural integrity (thereby degrading its ability to properly deliver the hydrogen).

Another family of hydrogen torches has been developed which addresses the need for performance under such extreme environmental conditions. In particular, silicon carbide torches which can tolerate the high temperature, corrosive environment of the water vapor are now available. However, relative to silica, silicon carbide is more difficult to manufacture in complex shapes and is therefore more expensive to make.

Accordingly, there is a need for a hydrogen torch which can operate in an extreme environment at reasonable cost and is easily manufactured.

SUMMARY OF THE INVENTION

In accordance with the present invention, there is provided a fluid delivery system for combining two reactive fluids comprising inner and outer fluid delivery tubes, wherein;

a) the outer tube comprises a first material, and
b) the inner tube comprises a second material.

In preferred embodiments, the first and second materials are fused silica and silicon carbide, respectively, and are connected together by a reverse ball joint connection.

DETAILED DESCRIPTION OF THE INVENTION

The torch of the present invention provides a heat resistant material, such as silicon carbide, in the regions of the system where high temperature resistance is important, and silica in the regions of the system where ease of fabrication is important. Accordingly, the torch of the present invention is easier to manufacture (and so is cheaper) than the monolithic silicon carbide torch and more durable than the silica monolithic torch, yet possesses the drawbacks of neither.

The second material comprising the inner tube should be able to withstand a water vapor containing environment of at least about 1200° C. without significant degradation. It should be gas tight and consist essentially of either high purity silicon carbide impregnated with silicon, high purity silicon carbide coated with CVD silicon carbide, or monolithic CVD silicon carbide. Preferably, the silicon carbide is CRYSTAR (TM) recrystallized silicon carbide, available from the Norton Company of Worcester, Mass.

It is also contemplated that other heat resistant ceramic materials such as silicon nitride and silicon oxynitride can be substituted into the inner tube either as a monolith or as a coating. In some embodiments, the inner tube comprises a base ceramic material and a coating thereon, wherein the coating is either more pure or more temperature resistant than the base ceramic material.

The first material comprising the outer tube can be any silica which is easily formed, is of high purity and can withstand a water vapor-containing environment of at least about 600° C. without significant degradation. Preferably, the first material is a glass. More preferably, it is fused silica.

Figure 1:
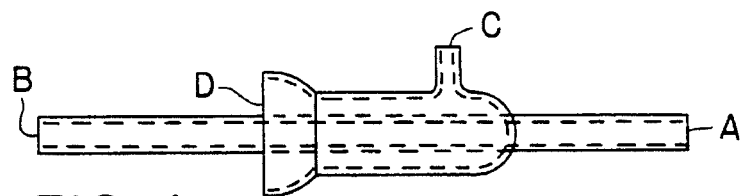
FIG. 1 is a prior art hydrogen torch design typically used for silica monolithic designs.
Figure 2:
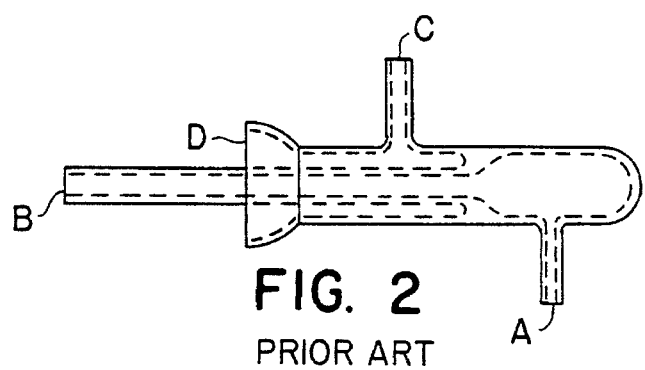
FIG. 2 is a prior art hydrogen torch design.
Figure 3:
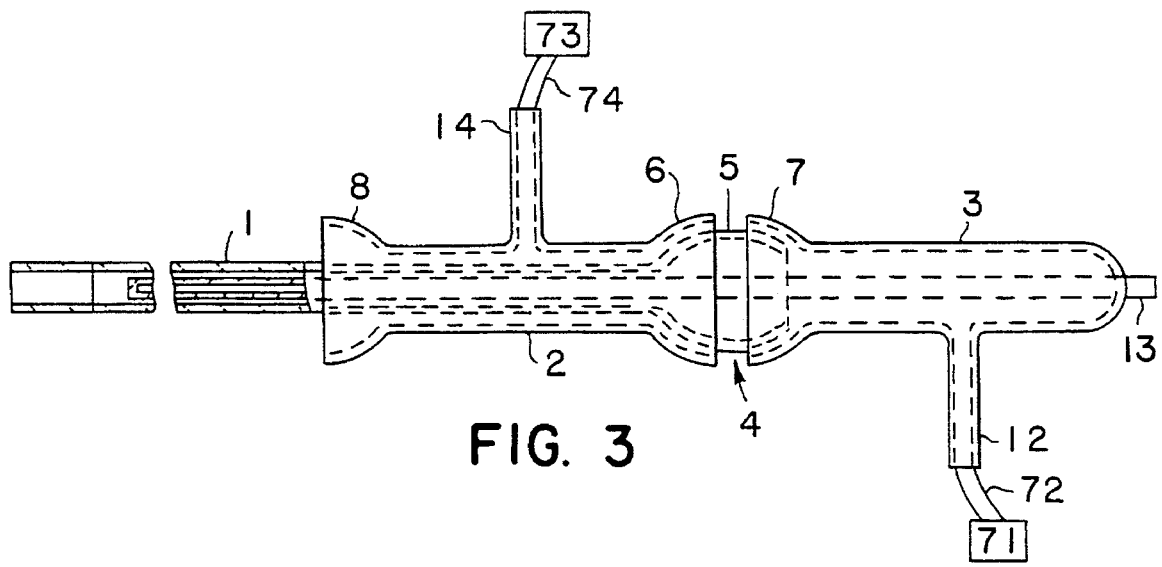
FIG. 3 presents one embodiment of the hydrogen torch of the present invention.

In one preferred embodiment, as presented in FIG. 3, the torch comprises a silicon carbide tube 1 and two silica tubes 2 and 3. Attachment of these pieces is achieved by the use of a double-sided ball joint connection 4 which holds the silicon carbide tube 1 in proper position with respect to the silica tubes 2 and 3 and provides sealing for separation of the different gases flowing through the system. This ball joint connection 4 comprises a silicon carbide ball section 5 (which is integral with silicon carbide tube 1) held between two opposing female silica sockets 6 and 7 (which are integral with silica tubes 2 and 3). The first silica tube 2 has an inlet 14 to accommodate the flow of oxygen gas therethrough and is large enough to allow passage of the silicon carbide tube 1 with enough clearance that oxygen can flow through the annulus defined by the inside diameter of the first silica tube 2 and the outside diameter of the silicon carbide tube 1. At the opposite end 8 of the first silica tube 2 is another female socket to allow connection to a process tube (not shown) in which the desired combustion will occur. The second silica tube 3 has an inlet 12 to accommodate the flow of hydrogen gas therethrough. In preferred embodiments, a hydrogen source 71 having a hydrogen supply line 72 extending therefrom is brought into fluid connection with inlet 12 of the second silica tube 3, and an oxygen source 73 having an oxygen supply line 74 extending therefrom is brought into fluid connection with inlet 14 of the first silica tube 2. In some embodiments, a thermocouple 13 is also housed with the torch.

Figure 4:
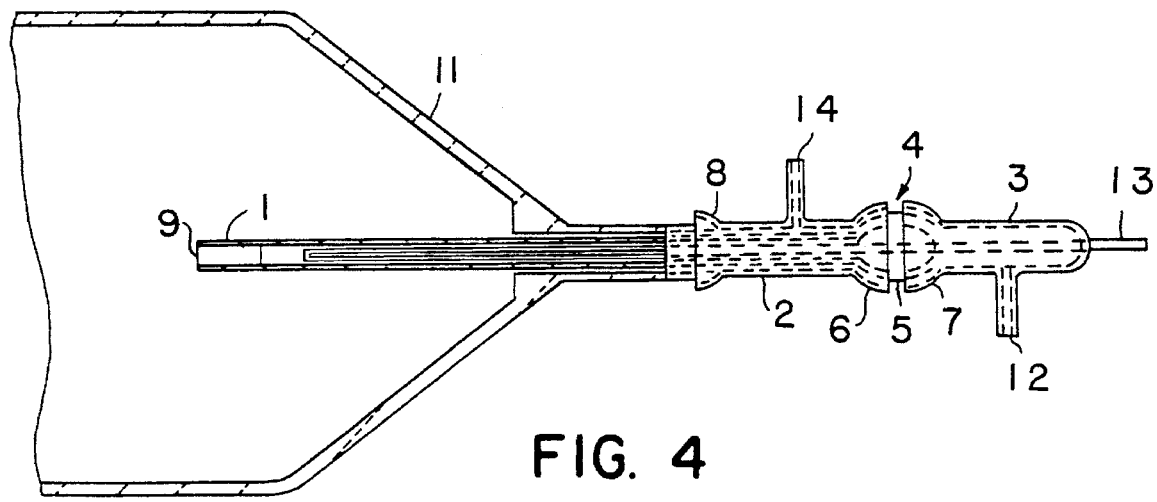
FIG. 4 presents a hydrogen torch of the present invention connected to a process tube.

Referring now to FIG. 4, the silicon carbide tube 1 has a length which allows it to extend through the first silica tube 2 and into a process tube 11 so that the hydrogen emerging from the tip end 9 of the silicon carbide tube 1 is properly located within the process tube 11. For ease of assembly, the outside diameter of silicon carbide tube 1 and tip end 9 should be able to pass through the first silica tube 2. Various conventional configurations may be used at the tip end 9 to control and direct the flow of the exiting hydrogen gas.

Due to the small size of the silica tube leading to the ball joint connection as well as the flow of room temperature gases on each side of the ball joint connection 4, the temperature at the silicon carbide ball 5 at the ball joint connection 4 will typically be less than about 300° C.

In some embodiments, the silicon carbide tube 1 has a 13 mm OD, an 8 mm ID and a 300 mm length; the silica tubes 2 and 3 have 20 mm OD's, 15 mm ID's and 50 mm lengths; and the ball joint connection 4 is 28/15, i.e., a 28 mm diameter spherical surface with a 15 mm ID clearance.

The connective ends of the present invention (e.g. element numbers 5,6,7,8,12 and 14 of FIG. 3) can be designed for any typical connection commonly used in the semiconductor manufacturing industry. For example, the connectors can be of the ball, socket, taper, or flange variety and may be constructed by conventional methods. Preferably, ball joint connections are held together with standard metal clamps. Although FIGS. 3 and 4 appear to show space between the SiC ball and silica sockets, it is understood these connectors are precision ground so that fluid will not pass through the connection. O-rings may be used to enhance the seal of the ball joint connection, if desired.

Figure 5:
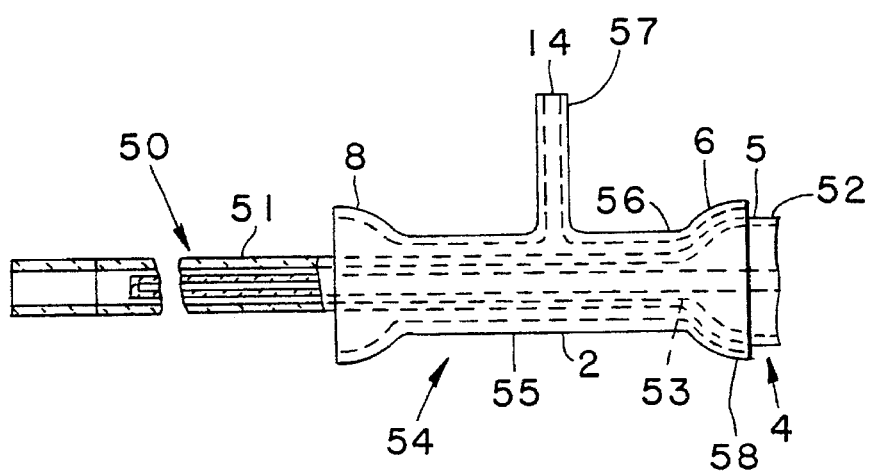
FIG. 5 presents an embodiment of a reverse ball joint connection.

FIGS. 3 and 4 disclose a novel means for connecting dissimilar materials SiC tube 1 and silica tube 2, termed a "reverse ball joint connection". Therefore, also in accordance with the present invention, there is provided a reverse ball joint connection defining a multi-fluid delivery system. Referring now to FIG. 5, this reverse ball joint connection comprises:

a) a first component 50 comprising:
  i) a first tube 51 having a first end 53, and
  ii) a first hollow hemispherical projection 52 opening outwardly from the first end 53, and
b) a second component 54 comprising:
  i) a second tube 55 having a first end 56,
  ii) a second hollow hemispherical projection 58 opening outwardly from the first end 56 of the second tube 55, and
  iii) a third tube 57 in fluid connection with the second tube 55, said second tube 55 having a larger diameter than and essentially concentric with the first tube 51, the first tube 51 being fitted within the second tube 55 such that the convex surface of the first projection 52 forms a reasonable seal with the concave surface of the second projection 58.

In contrast to the conventional ball joint connection, the reverse ball joint connection of the present invention defines an annulus between the tubes suitable for the introduction of a second fluid which can flow within the annulus isolated from fluid flowing within the inner tube.

Any conventional means for fabricating the silica and silicon carbide components of the present invention may be suitably used. For example, the casting of bimodal silicon carbide slips in plaster molds as disclosed in U.S. Pat. No. 3,951,587 ("the Alliegro processes") may be used to make siliconized silicon carbide tubes. However, when the desired SiC tube is small (i.e., less than about 20 mm in diameter and/or less than about 3 mm in wall thickness), novel techniques have been identified which more reliably achieve these goals.

In particular, there is now provided in accordance with the present invention a drain cast, recrystallized silicon carbide ceramic having a wall thickness of between about 0.75 and about 3 mm and a room temperature, 4 point flexure strength of at least about 250 MPa, preferably at least about 290 MPa. More preferably, the ceramic also possesses a 1200° C. 4 point flexural strength of at least about 300 MPa, most preferably at least about 375 MPa. In some preferred embodiments, this novel ceramic is made by a process comprising the steps of:

a) preparing a plaster mold,
b) coating the mold with a casting retardant,
c) filling the coated mold with a silicon carbide slip having a bimodal grain size distribution,
d) dewatering the slip through the mold to produce a casting having a thickness of between about 0.75 and about 3 mm.

For the purposes of the present invention, a "drain cast" SiC ceramic includes products made by drain casting, slip casting or pressure casting, wherein the products possess a relatively smooth surface and isotropic grain orientation. Accordingly, "drain cast" products do not include injection molded SiC ceramics, which are characterized by striations along the surface of the extrudate and preferential grain orientation. Similarly, a "recrystallized" SiC ceramic contains essentially no free carbon and does not include SiC ceramics in which carbon green bodies have been reaction sintered with silicon and so contain unreacted free carbon or silicon.

It has been unexpectedly found that when an ammonium alginate coating is applied to the plaster mold prior to introduction of the slip, a thin wall casting having suitable strength may be made. It is known in the art that a primary concern in casting is the achievement of high density. High density castings (i.e., about 85% of theoretical density) are typically achieved by using a bimodal slip, wherein the fine grains (typically 2–3 microns) fill in the voids created by the packing of the coarse grains (typically about 50 microns). However, it is also known that plaster of paris molds are frequently very porous (i.e., they contain pores which are 2–3 microns in diameter). Therefore, without wishing to be tied to a theory, it is believed that the porous plaster's high porosity deleteriously affected the casting of such bimodal slips in two ways. First, capillary forces generated by the interaction of the slip and the porous plaster yielded an excessively fast casting rate (i.e, a casting having a 1 mm wall would cast in about 0.5 minutes). This excessive casting rate prevented the proper ordering of the bimodal slip at the casting front, resulting in non-uniform microstructure through the thickness of in the casting. Second, because of the initial fast casting rate, the SiC fines are drawn to the slip-plaster interface, resulting in a casting surface predominated by the fine fraction. This second phenomenon is believed to be the cause for the orange peel appearance of the prior art castings.

Without wishing to be tied to a theory, it is believed that when the casting retardant coats the highly porous plaster mold surface, it reduces its effective porosity and permeability, thereby slowing the casting rate, promoting an ordered casting and increasing cast density. Its also retards the penetration of the fines fraction into the mold, thus allowing the fines to be retained in the casting, resulting in a smooth finish and, therefore, in easy mold release.

The casting retardant may be any coating which reduces the porosity of the porous plaster. Preferably, it is ammonium or sodium alginate or polyacrylic acid. More preferably, it is ammonium alginate. Typically, it is applied as an aqueous solution in an amount of between about 0.01 and about 1.0 w/o of the solution, preferably about 0.03 w/o.

The plaster mold of the present invention can be any mold typically used in the casting art. Preferably it is plaster of paris and has channels (pores) of about 2 microns in size. Preferably, it has a 60% consistency.

The slip of this aspect of the present invention typically comprises a bimodal distribution comprising between about 45 and about 55 w/o coarse SiC grains with a particle size ranging from 10 to 100 microns ("the coarse fraction"), and between about 45 and about 55 w/o of a fine SiC grain with a size distribution of between 1 and 4 microns ("the fine fraction"). Preferably, the fine fraction has an average particle size of about 2–3 microns and the coarse fraction has an average particle size of about 60 microns.

Other components of the slip include conventional additives such as deflocculating agents like NaOH, NH3OH and Na2SiO3; water present in an amount of from about 12 to 16 w/o solids; and acrylic binder present in the range from about 0.25 to 1.0 w/o solids.

In one especially preferred embodiment, a silicon carbide mixture consisting of about 48 w/o F240 sized green silicon carbide having an average size of about 60 microns and about 52 w/o green silicon carbide having an average size of 2–3 microns is prepared. To this mixture is added a deflocculating agent (NaOH) in an amount sufficient to achieve optimum deflocculation. Water is then added to provide a viscosity of between about 500 and about 750 cps. An acrylic latex binder is also added in an amount of about 0.25 w/o of the solids. These components are mixed in a ball mill which has been evacuated to vacuum level of between about 27 and 30 inches Hg and rolled for at least about 17 hours.

Concurrently, a plaster mold with a 70% consistency is coated with a 0.03% solution of ammonium alginate. The mold is capped off at the bottom and the alginate solution is poured in to fill the cavity. Solution is continually added as the mold absorbs the solution. After the mold has been filled with alginate for 3 minutes, the cap is removed and the solution drained.

The drained mold is allowed to air dry for 10 minutes prior to introduction of the slip. The mold is recapped and the slip is poured into the cavity. Casting time is dependent on both desired wall thickness and slip viscosity. At a desired viscosity of 750 cps and required nominal wall thickness of about 1.5 mm, the slip is allowed to remain in the mold 4–6 minutes prior to removing the cap.

After the slip has been drained from the mold, a small amount of de-ionized water is poured down the cavity to insure a lump free drained surface. The cast part is allowed to dry in the mold for 20–30 minutes. After that time, the mold is disassembled and the torch is removed by using an appropriate stripping fixture. This fixture simulates the outside shape of the cast part enabling it to remain dimensionally correct during drying.

The cast part is then allowed to air dry overnight or oven dry at about 54° C. for a minimum of 2 hours prior to green finishing. The dried alginate skin is removed from the cast part, the cast part is cut to length and any final finishing is performed.

The cast part is now ready to be fired. The initial firing step is conducted in a furnace which is heated to a temperature of about 1950° C. under a vacuum of about 0.5 torr in Ar atmosphere. After this initial firing, the cast part is prepared for one of two possible final firing steps which is dependent on part size and intended application. This second firing step consists of either impregnating with silicon to eliminate porosity or CVD coating with silicon carbide.

After this second firing, the part is machined to its final dimension.

Silicon carbide ceramics having outside diameters of between about 4 and about 20 mm, preferably about 6 mm, and wall thicknesses between about 0.75 and about 3.0 mm, preferably about 1 mm are obtainable in accordance with this invention. Because the casting is sufficiently slow, ordered casting is promoted, the typically rough "orange peel" type drain cast surface is eliminated and a casting having a smooth surface is produced.

A cast, unfired body produced in accordance with the above especially preferred embodiment exhibits a bulk density of at least about 2.75 g/cc and a four point bending strength of at least about 7 MPa. Its pore size ranges from about 0.1 to 4.0 microns. Its average pore size is about 0.4 microns. In contrast, the conventional cast unfired, SiC body has an average pore size of about 1.8 microns.

Physical and mechanical analyses were undertaken on the siliconized silicon carbide product produced in accordance with the especially preferred embodiment of the present invention. Flexural strength testing was undertaken on a 4 point quarter point fixtures having an upper span of 20 mm and a lower span of 40 mm. The flexure bar, whose dimensions were 3 mm×4 mm×50 mm, was flexed at a load rate of about 0.02 inches per minute. The room temperature flexural strength was found to be about 296 MPa. This represents a 38% increase in strength over the conventional siliconized silicon carbide product. The 1200° C. flexural strength was found to be about 375 MPa, a 60% increase in strength over the conventional siliconized silicon carbide product. In addition, analysis of the variation in wall thickness was measured. The variation in thickness of a 1 mm wall of the present invention was found to be about 0.2 mm/m, i.e., the thickness varied from about 0.9 to about 1.1 mm (top to bottom) over a 1 meter length. In contrast, the conventional siliconized silicon carbide ceramic possessed a variation of about 0.6 mm/m.

The novel recrystallized silicon carbide ceramics of the present invention may be used in conventional siliconized silicon carbide or CVD coated silicon carbide applications, including those applications disclosed in U.S. Pat. No. 3,951,587.

We claim:

1. A hydrogen torch comprising inner and outer fluid delivery tubes, a third fluid delivery tube, a hydrogen source having a hydrogen supply line extending therefrom, and an oxygen source having an oxygen supply line extending therefrom, wherein:

a) the outer tube comprises a first material and has an inlet in fluid connection with one of the supply lines, b) the inner tube comprises a second material and has a first end and a second end, and c) the third tube is in fluid connection with the first end of the inner tube and has an inlet in fluid connection with the remaining supply line.

2. The hydrogen torch of claim 1 wherein the outer tube comprises fused silica.

3. The hydrogen torch of claim 2 wherein the inner tube consists essentially of a material selected from the group consisting of high purity silicon carbide impregnated with silicon, high purity silicon nitride, monolithic CVD silicon carbide, and high purity silicon carbide coated with CVD silicon carbide.

4. The hydrogen torch of claim 1 wherein the inner tube comprises silicon carbide.

5. The hydrogen torch of claim 1 wherein the inner tube consists essentially of silicon carbide.

6. The hydrogen torch of claim 1 wherein the outer tube is fused silica and the inner tube comprises silicon carbide.

7. The hydrogen torch of claim 6 wherein the third tube is silica.

8. The hydrogen torch of claim 1 wherein the first end of the inner tube has a ball shape.

9. The hydrogen torch of claim 1 wherein the fluid connection between the third tube and the first end of the inner tube is accomplished by a reverse ball joint connection.

10. The hydrogen torch of claim 9 wherein the outer tube has a first and second end, the first end of the outer tube forming a sealing connection with the first end of the inner tube, and the second end of the outer tube adapted to form a fluid connection with a process tube.

11. The hydrogen torch of claim 1 wherein the inner tube comprises a base ceramic material and a coating thereon.

12. The hydrogen torch of claim 11 wherein the coating is selected from the group consisting of silicon nitride and silicon carbide.

13. The hydrogen torch of claim 11 wherein the base ceramic material is selected from the group consisting of silicon nitride and silicon oxynitride.

14. The hydrogen torch of claim 1 wherein the inlet of the outer tube is in fluid connection with the oxygen supply line and the inlet of the third tube is in fluid connection with the hydrogen supply line.

* * * * *